United States Patent
Khatri

(10) Patent No.: US 6,653,813 B2
(45) Date of Patent: Nov. 25, 2003

(54) APPARATUS AND METHOD FOR THE POWER MANAGEMENT OF OPERATIVELY CONNECTED MODULAR DEVICES

(75) Inventor: Nizam Issa Khatri, Indianapolis, IN (US)

(73) Assignee: Thomson Licensing, S.A., Boulogne-Billancourt (FR)

(*) Notice: Subject to any disclaimer, the term of this patent is extended or adjusted under 35 U.S.C. 154(b) by 0 days.

(21) Appl. No.: 10/103,348

(22) Filed: Mar. 21, 2002

(65) Prior Publication Data

US 2003/0178967 A1 Sep. 25, 2003

(51) Int. Cl.⁷ .................. H01M 10/44; H01M 10/46
(52) U.S. Cl. ........................................... 320/103
(58) Field of Search ........................ 320/103, 110, 320/126, 132, 137, 138

(56) References Cited

U.S. PATENT DOCUMENTS 6,140,800 A * 10/2000 Peterson
6,271,645 B1 * 8/2001 Schneider et al.
6,320,358 B2 * 11/2001 Miller

* cited by examiner

Primary Examiner—Edward H. Tso
(74) Attorney, Agent, or Firm—Joseph S. Tripoli; Joseph J. Laks; Reitseng Lin

(57) ABSTRACT

A modular electronic system is provided wherein a first device is powerable by a first rechargeable battery. A connector operationally connects the first device to a second device powerable by a second rechargeable battery. A charge control circuit is included in the first device for determining the condition of charge of the first rechargeable battery and determining the condition of charge of the second rechargeable battery. The charge control circuit includes means for charging the battery with the lower condition of charge from the battery with the higher condition of charge. In this way, by sharing power resources, the cooperative operational life of the devices can be increased.

20 Claims, 2 Drawing Sheets

APPARATUS AND METHOD FOR THE POWER MANAGEMENT OF OPERATIVELY CONNECTED MODULAR DEVICES

TECHNICAL FIELD

The present invention relates to modular electronic systems, and, more particularly, to a power management system for such modular peripheral devices.

BACKGROUND

Portable computers, personal digital assistants (PDAs), cellular telephones, pagers, calculators, and other such portable electronic devices are commonplace. One of the reasons portable electronic devices are so popular is that they provide a user with freedom regarding the location of their use. Although these devices may be powerable from a standard AC outlet, AC (electrical utility) power is often not convenient or readily available, e.g., while traveling. Hence, their portable utility is an important attribute.

Early portable devices relied upon rechargeable lead-acid batteries. However, for some devices, such as portable computers, the power requirements were so great that the "on-time" of the device, i.e., the useful battery life between charges, was often little more than an hour. Additionally, early rechargeable batteries were inefficient at recharging, having recharge times more than three to four times longer than that of their useful life between charges. This amounted to an overnight charge in order to obtain an hour or so of useful life during the day.

Since the lead-acid battery days as discussed above, there have been substantial improvements in battery technology. Currently, most rechargeable batteries, often called battery packs, are Nickel Cadmium (NiCad™) and Nickel Metal Hydride (NiMH), both of which require a constant current to recharge properly, while the Lithium-Ion (Li-Ion) battery requires a constant voltage to recharge properly. Moreover, the different types of charging systems typically terminate charging under different conditions, i.e., the NiCad™ battery recharge system should terminate charging upon detection of a negative change in terminal voltage, the NiMH battery recharge system should terminate charging upon detection of a temperature gradient, and the Li-Ion battery recharge system should terminate charging upon detection of a predetermined terminal voltage.

Moving now to a related subject, there has been a movement toward standardizing the formats for use in the interconnection of circuit cards for modular electronic systems. In particular, the PC and Memory Card International Association (PCMCIA) was formed with the goal of promoting the interchangeability of integrated circuit and memory cards among computers and other types of electronic devices. Toward this end, the PCMCIA has promulgated both physical and electrical standards to ensure that cards will be able to be used with different pieces of equipment. Data storage, memory, peripheral expansion, and I/O card types, constructed in accordance with these standards, should be able to be interconnected/networked with each other, using connectors conforming to such standards. The PCMCIA connector has subsequently become known as "PC Card". Therefore, computer systems using the PCMCIA/PC Card format permit the interchange of modules, thereby expanding the functions of host computer systems, and particularly portable host computer/digital systems. A "Zoomed Video" (ZV) standard, for writing video data directly to a VGA controller over a ZV bus and not the system bus, is a variant of the PC card standard, and as with other variants of the PC card standard, are considered herein as PCMCIA/PC card connectors.

Thus, PC cards have become a common way to add peripheral devices to PDAs and EDAs (entertainment digital assistant). Circuit utilities, such as memory or communication devices, e.g., IEEE 802.11 bluetooth communications capability or wireless LAN, can be placed on a PC card having the PCMCIA/PC Card interface, e.g., for communication with other devices or for access to the internet. In this manner, plug-in modules with this standard format are interchangeable when the user wishes to change or add the additional features provided by those plug-in modules. Further, the present device, which is an EDA, can be used with other PCMCIA/PC Card interface companion devices, e.g., a hard disk drive, a wireless modem, an infrared (IR) receiver, a TV or AM-FM tuner, a removable disk drive such as what is currently called a Zip™ drive, or a DVD/CD player. When used with a DVD/CD player or the like, the EDA can serve as an LCD display for the video from the player or other video streaming multimedia device, whether connected by wire or through a wireless modem, or from an IR transmitter with the EDA having an appropriate IR receiver.

The PC cards can be powered by the host device to which they are operatively connected, e.g., via a PCMCIA/PC Card connector. This connection causes no problem when the PC cards are used with host devices connected to electrical utility power. However, this connection can cause problems when PC cards are used, e.g., with handheld personal computers. For example, some handheld personal computers are powered by as little as two rechargeable AA size batteries, and thus have little spare current capacity for providing power to a PC card. This lack of spare power capacity can limit the types of PC cards used with some handheld computers.

Further, as electronic equipment has become more miniaturized, the available power from the host electronic equipment for use by a plug-in module has become even more limited. This limitation is best illustrated by the miniaturization of personal computers into laptop or handheld versions with further limitations on battery size and the available power for powering plug-in modules.

Often, a PC card with a battery pack can be selectively powered either by the host personal computer or by its own battery pack. This provides for flexibility in power management. If a handheld personal computer has a lot of power, such as when the personal computer is connected to an external power source, the handheld personal computer can supply power to the PC card. This allows the PC card battery pack to save its charge when a wall outlet is nearby. In the converse, U.S. Pat. No. 5,896,574 shows the battery supplies of plug-in cards helping to power a host device through a PCMCIA/PC Card connector.

Obviously, as the batteries of electronic devices become exhausted, they must be recharged or replaced. When multiple electronic devices are operatively connected together, this cooperation can be disrupted when the battery in a cooperating device is exhausted. Thus, in the case of such cooperating electronic devices, the devices with more power, which maintain operational condition, may become impeded in their operation due to their dependence on devices that have become inoperable and powerless due to exhausted batteries. Further, in such situations, the power consumption within each battery powered device can be managed within the particular device to prolong the power supply duration of that particular battery and keep the device operational. However, not all peripheral devices draw the same power and some peripheral devices can be used more frequently than others, with the problem of having to more often replace or recharge the batteries in these more often used devices. This problem can occur even when other devices, e.g., those that are seldom used or have low power drain, still have operational batteries. This can happen to devices which can be connected together by, e.g., PCMCIA/PC Card, USB (Universal Serial Bus), Firewire 1394, or other protocols, regardless of how they are connected to each other, e.g., in a daisy chain arrangement or in a hub and spoke arrangement.

Thus, it is desirable to have an improved apparatus and method for managing the power in modular electronic systems. Additionally, It is advantageous to provide plug-in module systems with a power management system that can aid in increasing the cooperative operational life of the interconnected/networked devices.

SUMMARY OF THE INVENTION

Briefly, a modular electronic system is disclosed wherein a first device is powerable by a first rechargeable battery. A connector operationally connects the first device to a second device powerable by a second rechargeable battery. A charge control circuit is included in the first device for determining the condition of charge of the first rechargeable battery and determining the condition of charge of the second rechargeable battery. The charge control circuit includes means for charging the battery with the determined lower condition of charge from the battery with the determined higher condition of charge.

BRIEF DESCRIPTION OF THE DRAWINGS

Reference can be made to the drawings wherein.

DETAILED DESCRIPTION OF THE PREFERRED EMBODIMENT(S)

Figure 1:
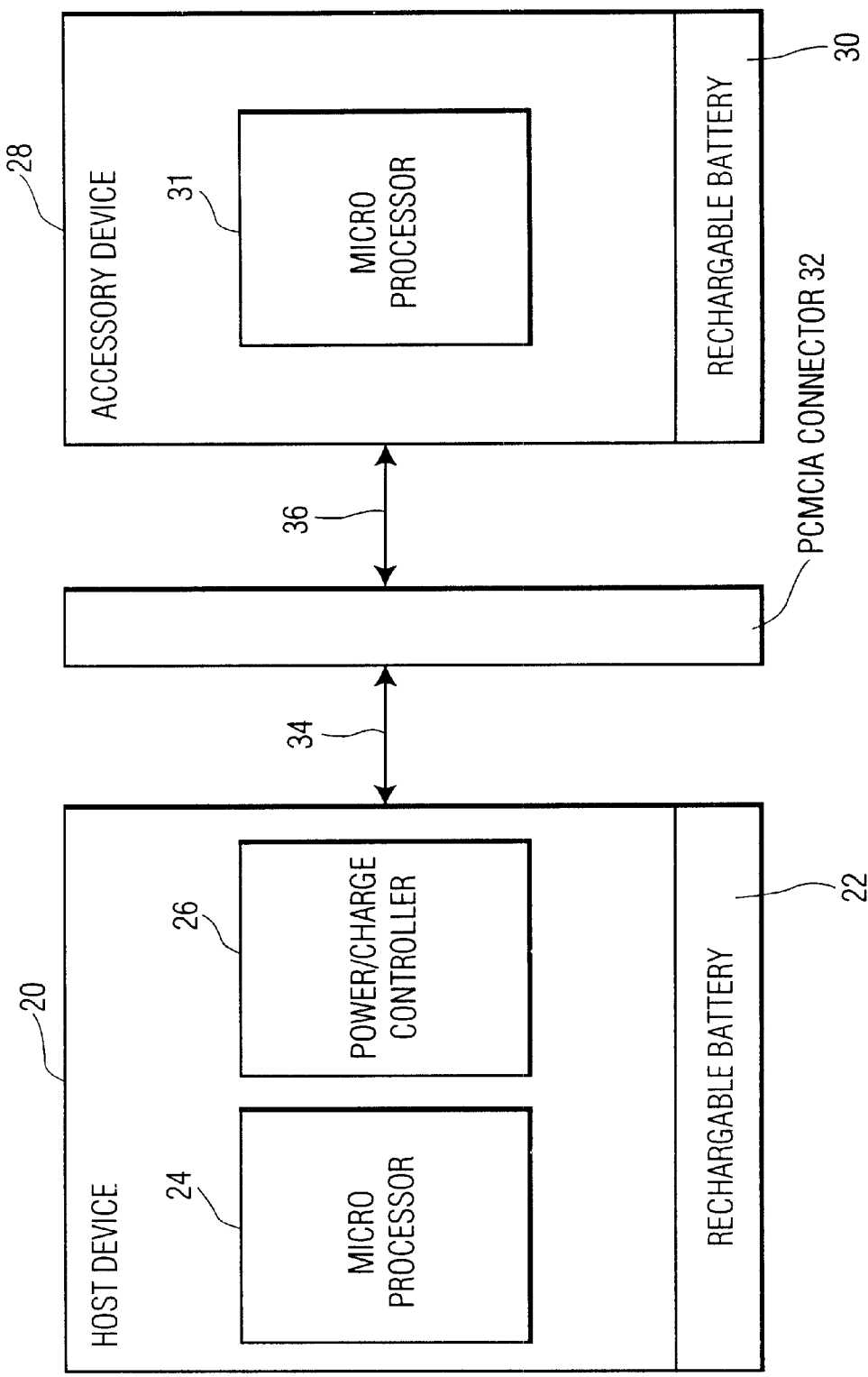
FIG. 1 shows a block diagram representation of a device arrangement according to aspects of the present invention including a power/charge management arrangement.

FIG. 1 shows a block diagram of a portable personal computer/host device 20, having a rechargeable battery 22, a microprocessor 24 and a power/charge controller 26. PC card 28, which plugs into host device 20, includes a rechargeable battery 30 and a microprocessor 31. Host device 20 and PC card 28 are connected to each other by a connector, which in the exemplary embodiment is a PCMCIA/PC Card connector 32. The host device 20 and PC card 28 each include a microprocessor and known software to operate with each other through connector 32. PCMCIA/PC Card connector 32 can be connected directly to one of the devices 20, 28 and connected to the other device 20, 28 via a multiple wire cable 34, 36. In the alternative, device 28 can be directly connected to device 20 through connector 32, e.g., PC card 28 fits into a slot (not shown) in host 20 using connector 32. Additionally, the exemplary connector 32 is shown as a single connector, although a connector comprising a plurality of separate pieces can be used.

Power/charge controller 26 controls the power in host device 20 and through PCMCIA/PC Card connector 32, PC card 28. It should be noted that battery 30 may not be required for the operation of the PC card 28 when host device 20 has enough power to energize PC card 28. This can happen, e.g., when host device 20 is connected to a wall outlet adaptor (not shown).

Power/charge controller 26 collects information from the electronic devices to identify devices which can be used in supplying power. Such information can include measuring a terminal power supply voltage of a PC card 28 or reading information provided by the ROM portion of microprocessor 31, otherwise referred to as the CIS (card information structure), which describes the operating characteristics of the card. Information can also include battery discharge information, which can be determined, e.g., by measurement of the terminal voltage of the battery with or without placing a momentary load across a battery, or by measurement of the change of battery terminal voltage or the current drawn upon application of the momentary load. It is within the contemplation of the present invention that the measurement of terminal battery voltage need not be made directly at the terminals of the battery, i.e., the measurement can be made of a voltage in a circuit powered by the battery, with the value of measured voltage having some correlation to the actual terminal voltage of the battery, e.g., a resistive voltage divider. Although the present embodiment has the condition of charge of the battery of the accessory device being made through the connector, it is within the contemplation of the present invention, that the condition of charge of the battery of the accessory device can be ascertained without the connector, e.g., via a wireless transmission of the information.

It is preferred that the nominal voltage of both battery 22 of the host 20 and battery 30 of PC card 28 be the same. However, if a higher voltage battery is severely depleted, then it can be charged as best it can by the battery of the lower nominal voltage. Although this will not fully charge the higher voltage battery, it is the best that can be done under the circumstances and can still be helpful with the is charging current helping to keep the device with the severely depleted battery operational. However, it is within the contemplation of the present invention that host 20 can be provided with an inverter (not shown) to generate a higher voltage for recharging battery 30 when battery 30 has a higher nominal voltage than battery 22.

Although the exemplary embodiment uses a PCMCIA connector, it is within the contemplation of the present invention that the present invention is not limited to a PCMCIA connector, and that other kinds of suitable connectors can be used.

Figure 2:
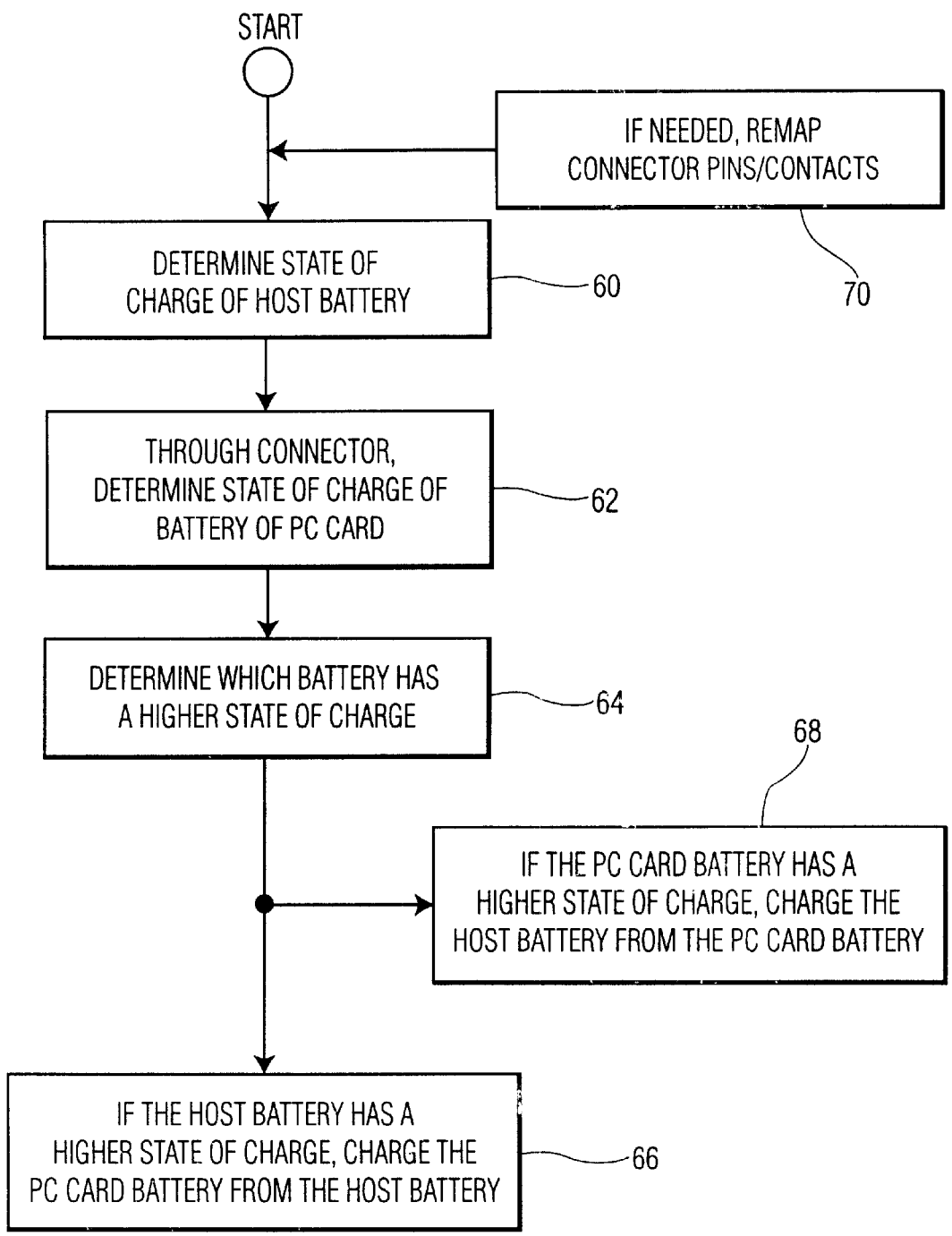
FIG. 2 is a flow-chart of the power/charge management arrangement of FIG. 1.

Referring now to FIG. 2, power/charge controller 26 measures the charge condition of rechargeable battery 22 of host device 20 at 60, in a manner discussed above, and using an appropriate contact(s)/pin(s) of connector 32, similarly measures the condition of charge of rechargeable battery 30 of the accessory device 28, at 62. If it is determined at 64 that one is lower than the other, charging can commence with the battery of a higher condition of charge, charging the battery of the lower condition of charge per blocks 66 and 68. The control of charging can be accomplished in a known manner, e.g., by operational amplifiers (not shown) or by the biasing of diodes (not shown) to control the direction and/or the amount of charge current flow, using criteria discussed above in connection with the charging of various types of rechargeable batteries. Obviously, Lithium Ion batteries are easier for exercising charge control since Lithium Ion batteries require only a simple monitoring of terminal voltage.

Connector 32 of the exemplary embodiment is a PCMCIA/PC Card connector which ordinarily has pins/ contacts 62 and 63 designated for monitoring the power supplies of connected devices. PCMCIA/PC Card pins/contacts are rated for conducting a modest amount of current, e.g., about 500 milliamperes. Likewise, USB and Firewire connectors have pins/contacts which are rated for conducting a similar modest amount of current. According to aspects of the present invention, when a card 28 with a battery 30 is inserted into connector 32, host 20 recognizes the card and accordingly remaps pins/contacts 62 and 63 of PCMCIA/PC Card connector 32, on both sides of the connector, to permit the conduction of charging currents between the power supplies of the connected devices. It is within the contemplation of the present invention that under the control and/or initiation of microprocessor 24, that other connector pins/contacts can be remapped, if necessary, on both sides of connector 32, for such power supply purposes, if these other connector pins/contacts are not needed for other purposes. This remapping can be done at 70, at the initiation of power/charge controller 26, by microprocessor 24, which in a known manner is programmed to originally map the connector pins/contacts for their operation according to the type of connector used.

What is claimed is:

1. Apparatus comprising:
    a first device powerable by a first rechargeable battery,
    a connector for operationally coupling the first device to a second device powerable by a second rechargeable battery,
    means for determining the condition of charge of the first rechargeable battery and determining the condition of charge of the second rechargeable battery, and
    means for charging through the connector the rechargeable battery having a determined lower condition of charge from the rechargeable battery having a determined higher condition of charge.

2. The apparatus of claim 1 wherein the connector has a plurality of contacts and the operation of at least one of the contacts is remappable for accomplishing the charging.

3. The apparatus of claim 1 wherein the connector is a PCMCIA/PC Card connector.

4. The apparatus of claim 1 wherein at least one of the first and second devices is a portable electronic device.

5. The apparatus of claim 1 wherein the charging of the battery having the lower condition of charge from the battery having the higher condition of charge is controlled by a charge control circuit.

6. The apparatus of claim 1 wherein the first and second rechargeable batteries have the same nominal voltage.

7. The apparatus of claim 1 wherein the condition of charge is determined by measuring one of a battery voltage and a voltage corresponding to the battery voltage.

8. The apparatus of claim 1 wherein the condition of charge is determined by measuring the magnitude of a current drawn from at least one of the batteries by connection of a predetermined load.

9. Apparatus comprising:
    a first portable electronic device powerable by a first rechargeable battery,
    a PCMCIA/PC Card connector for operationally coupling the first device to a second portable electronic device powerable by a second rechargeable battery,
    means for determining the condition of charge of the first rechargeable battery and determining the condition of charge of the second rechargeable battery, and
    means for charging through the connector the rechargeable battery having a determined lower condition of charge from the rechargeable battery having a determined higher condition of charge.

10. The apparatus of claim 9 wherein the connector has a plurality of contacts and the operation of at least one of the contacts is remappable for accomplishing the charging.

11. The apparatus of claim 9 wherein the charging of the battery having a lower condition of charge from the battery having a higher condition of charge is controlled by a charge control circuit.

12. The apparatus of claim 9 wherein the first and second rechargeable batteries have the same nominal voltage.

13. The apparatus of claim 9 wherein the condition of charge is determined by measuring one of a battery voltage and a voltage corresponding to the battery voltage.

14. The apparatus of claim 9 wherein the condition of charge is determined by measuring the magnitude of a current drawn from at least one of the battery by connection of a predetermined load.

15. A method comprising the steps of:
    determining the condition of charge of a first rechargeable battery which powers a first device, and determining the condition of charge of a second rechargeable battery which powers a second device, and
    charging through the connector the rechargeable battery having a determined lower condition of charge from the rechargeable battery having a determined higher condition of charge.

16. The method of claim 15 wherein at least one of the first and second devices is a portable electronic device.

17. The method of claim 15 wherein the connector is a PCMCIA/PC Card connector.

18. The method of claim 15 wherein the first and second rechargeable batteries have the same nominal voltage.

19. The method of claim 15 wherein the charging of the battery having a lower condition of charge from the battery having a higher condition of charge is controlled by a charge control circuit.

20. The method of claim 15 wherein the connector has a plurality of contacts and the operation of at least one of the contacts is remappable for accomplishing the charging.

* * * * *